(12) United States Patent
Seto (10) Patent No.: US 8,902,464 B2
(45) Date of Patent: Dec. 2, 2014

(54) COLOR PROCESSING APPARATUS AND METHOD FOR COLOR PROCESSING USING COLORIMETRIC DATA OF A COLOR CHART

(75) Inventor: Takamasa Seto, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 1003 days.

(21) Appl. No.: 12/407,239

(22) Filed: Mar. 19, 2009

(65) Prior Publication Data

US 2009/0244573 A1 Oct. 1, 2009

(30) Foreign Application Priority Data

Mar. 26, 2008 (JP) ................................ 2008-081744

(51) Int. Cl.
*G06K 1/00* (2006.01)
*H04N 1/60* (2006.01)
*G06K 9/00* (2006.01)
*G09G 5/02* (2006.01)

(52) U.S. Cl.
CPC .................................. *H04N 1/6033* (2013.01)
USPC ........... 358/1.9; 358/1.14; 358/1.15; 358/2.1; 382/141; 382/167; 345/581; 345/589

(58) Field of Classification Search
None
See application file for complete search history.

(56) References Cited

U.S. PATENT DOCUMENTS

| | | | |
|---|---|---|---|
| 5,673,112 A | 9/1997 | Schramm | |
| 6,888,648 B2 * | 5/2005 | Odagiri et al. | 358/1.9 |
| 6,952,494 B2 * | 10/2005 | Odagiri et al. | 382/162 |
| 7,154,634 B2 * | 12/2006 | Hung | 358/1.9 |
| 7,345,788 B2 * | 3/2008 | Kiyosu et al. | 358/2.1 |
| 7,466,463 B2 * | 12/2008 | Kondo | 358/504 |
| 7,574,040 B2 * | 8/2009 | Ito et al. | 382/167 |
| 7,626,723 B2 * | 12/2009 | Yamada et al. | 358/1.9 |
| 2002/0159083 A1 * | 10/2002 | Arai et al. | 358/1.9 |
| 2005/0270321 A1 * | 12/2005 | Ono | 347/14 |
| 2006/0187455 A1 * | 8/2006 | Ito et al. | 356/402 |
| 2007/0229870 A1 * | 10/2007 | Doi et al. | 358/1.9 |

FOREIGN PATENT DOCUMENTS

| | | | |
|---|---|---|---|
| JP | 2002-279436 A | | 9/2002 |
| JP | 2004-147265 A | | 5/2004 |
| JP | 2007-038578 | * | 2/2007 |
| JP | 2007-158932 A | | 6/2007 |

OTHER PUBLICATIONS

English Translation of Japanese Office Action dated Mar. 23, 2012 for JP 2008-081744.

* cited by examiner

*Primary Examiner* — Steven Kau
(74) *Attorney, Agent, or Firm* — Carter, DeLuca, Farrell & Schmidt, LLP (57) ABSTRACT

Colorimetric values for generating a color separation table, which are obtained by measuring a plurality of color patches included in a color chart, are input, and measurement values corresponding to the input plural measurement values other than supervised input measurement values are estimated using supervised measurement values. Then, color differences between the estimated measurement values and the input plural measurement values other than the supervised measurement values are calculated. Based on the color differences, it is determined whether printing of the plurality of color patches or measurement of the plurality of color patches has been performed correctly.

10 Claims, 8 Drawing Sheets

FIG. 2

| R | G | B | C | M | Y | K | Lc | Lm |
|---|---|---|---|---|---|---|----|----|
| 0 | 0 | 0 | 0 | 0 | 0 | 255 | 0 | 0 |
| 0 | 0 | 32 | 30 | 45 | 0 | 150 | 0 | 0 |
| 0 | 0 | 64 | 50 | 70 | 0 | 30 | 0 | 0 |
| 0 | 0 | 96 | 70 | 80 | 0 | 5 | 0 | 0 |
| 0 | 0 | 128 | 70 | 90 | 0 | 0 | 0 | 0 |
| 0 | 0 | 160 | 70 | 80 | 0 | 0 | 0 | 0 |
| 0 | 0 | 192 | 50 | 70 | 0 | 0 | 0 | 0 |
| 0 | 0 | 224 | 30 | 45 | 0 | 0 | 0 | 0 |
| 0 | 0 | 255 | 0 | 0 | 0 | 0 | 0 | 0 |
| 0 | 32 | 0 | 20 | 0 | 0 | 150 | 5 | 0 |
| ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ |
| 255 | 255 | 224 | 0 | 0 | 10 | 0 | 0 | 0 |
| 255 | 255 | 255 | 0 | 0 | 0 | 0 | 0 | 0 |

| ID | PATCH NUMBER | | | INK VALUE | | | | | |
|---|---|---|---|---|---|---|---|---|---|
| | PAGE | ROW | COLUMN | C | M | Y | K | Lc | Lm |
| 1 | 1 | 1 | 1 | 0 | 0 | 0 | 0 | 0 | 0 |
| 2 | 1 | 1 | 2 | 255 | 0 | 0 | 0 | 0 | 0 |
| 3 | 1 | 1 | 3 | 0 | 255 | 0 | 0 | 0 | 0 |
| 4 | 1 | 1 | 4 | 255 | 255 | 0 | 0 | 0 | 0 |
| 64 | 1 | 3 | 4 | 255 | 255 | 255 | 255 | 255 | 255 |
| 65 | 1 | 3 | 5 | 85 | 0 | 0 | 0 | 0 | 0 |
| 66 | 1 | 3 | 6 | 170 | 0 | 0 | 0 | 0 | 0 |
| 67 | 1 | 3 | 7 | 170 | 0 | 0 | 0 | 0 | 0 |
| 68 | 1 | 3 | 8 | 0 | 85 | 0 | 0 | 0 | 0 |
| 69 | 1 | 3 | 9 | 85 | 85 | 0 | 0 | 0 | 0 |
| 4092 | 7 | 16 | 12 | 85 | 85 | 170 | 170 | 170 | 170 |
| 4093 | 7 | 16 | 13 | 170 | 85 | 170 | 170 | 170 | 170 |
| 4094 | 7 | 16 | 14 | 0 | 170 | 170 | 170 | 170 | 170 |
| 4095 | 7 | 16 | 15 | 85 | 170 | 170 | 170 | 170 | 170 |
| 4096 | 7 | 16 | 16 | 170 | 170 | 170 | 170 | 170 | 170 |

SUPERVISED DATA (IDs 1–64)

FIG. 7

| ID | PATCH NUMBER | | | SPECTRAL REFLECTANCE | | | | |
|---|---|---|---|---|---|---|---|---|
| | PAGE | ROW | COLUMN | 380nm | 390nm | ... | 720nm | 730nm |
| 1 | 1 | 1 | 1 | 0.61 | 0.76 | ... | 0.85 | 0.80 |
| 2 | 1 | 1 | 2 | 0.58 | 0.75 | ... | 0.76 | 0.64 |
| 3 | 1 | 1 | 3 | 0.55 | 0.73 | ... | 0.57 | 0.48 |
| ... | ... | ... | ... | ... | ... | ... | ... | ... |
| 4096 | 7 | 16 | 16 | 0.02 | 0.02 | ... | 0.04 | 0.05 |

FIG. 8

COLOR PROCESSING APPARATUS AND METHOD FOR COLOR PROCESSING USING COLORIMETRIC DATA OF A COLOR CHART

BACKGROUND OF THE INVENTION

1. Field of the Invention

The present invention relates to color processing using the colorimetric data (measurement values) of a color chart.

2. Description of the Related Art

As a technique of detecting and preventing human errors in printing and colorimetric measurement of a color chart that includes a plurality of color patches, there is known a method of adding a specific marker image to the color chart. However, this method cannot deal with a smudge on the color chart or the like. In addition, since it is necessary to obtain and analyze the added marker image, the cost increases particularly when a high-precision colorimeter is used.

When the pattern of a color chart is limited in advance, the color value of a color (reference color) to be measured may be stored in advance, and the validity of the colorimetric result may be evaluated by comparing the colorimetric value with the color value of the reference color. In this method, when the colorimetric value is largely different from the color value of the reference color due to the characteristics of a printing paper sheet on which the color chart is printed, the evaluation accuracy decreases. In addition, when the pattern of the color chart is not known in advance, evaluation cannot be performed.

SUMMARY OF THE INVENTION

In an aspect, there is provided a color processing method including inputting plural measurement values for generating a color separation table, which are obtained by measuring a plurality of color patches included in a color chart; estimating measurement values, which correspond to the input plural measurement values other than supervised input plural measurement values, using the supervised input plural measurement values; calculating color differences between the estimated measurement values and the corresponding input plural measurement values; and determining whether printing of the plurality of color patches or measurement of the plurality of color patches has been performed correctly, based on the color differences.

According to the above-described aspect, it becomes possible to determine whether printing and colorimetric measurement of a color chart have been performed correctly or not.

Further features of the present invention will become apparent from the following description of exemplary embodiments with reference to the attached drawings.

DESCRIPTION OF THE EMBODIMENTS

Color processing of an embodiment according to the present invention will be described below with reference to the accompanying drawings. Note that processing in an image processing apparatus that generates a color separation table for an inkjet printer (hereinafter, "printer") having six color inks (color materials) will be described below.

Arrangement of Printer

Figure 1:
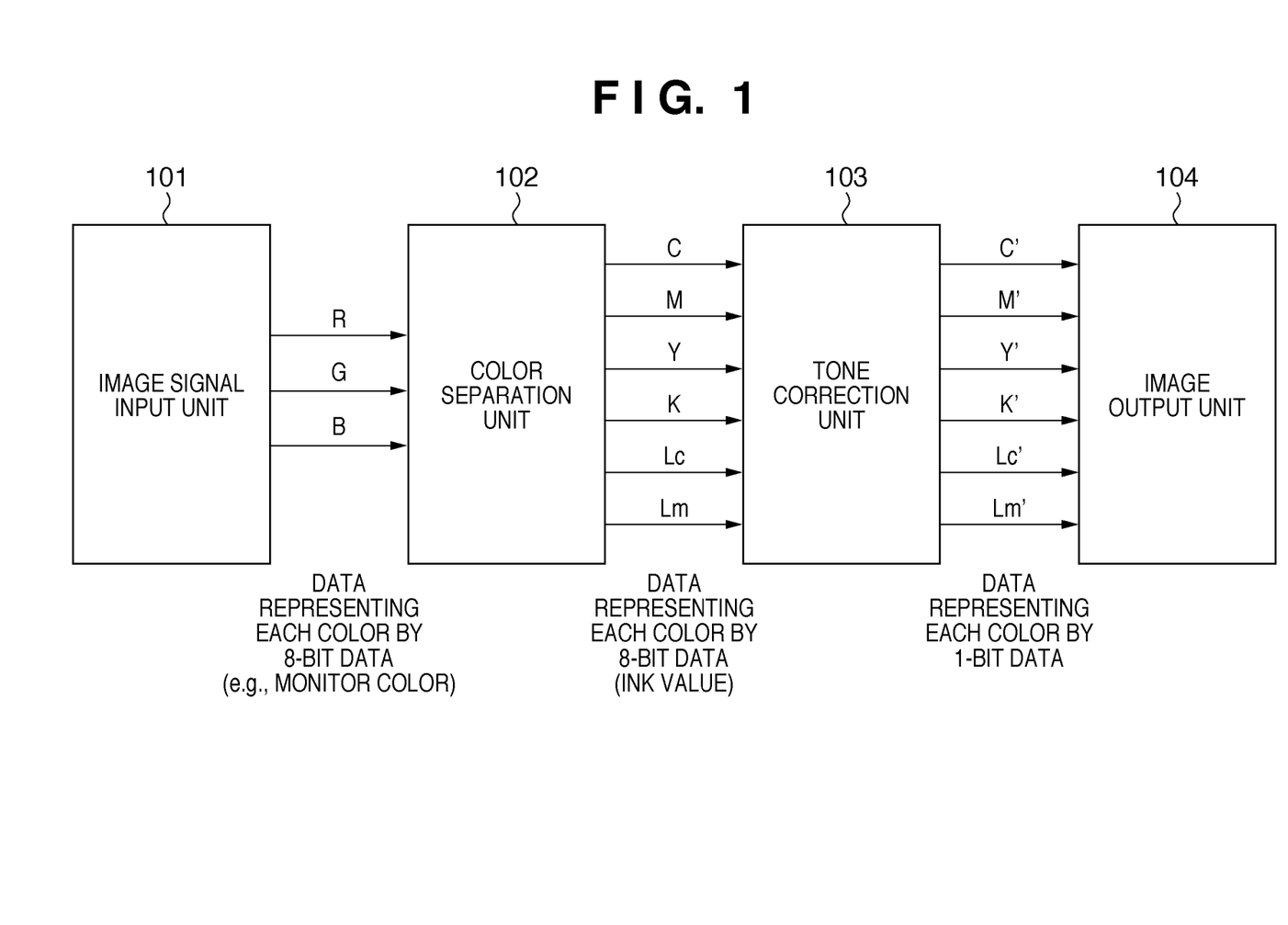
FIG. 1 is a block diagram illustrating the sequence of the printing process of a printer.

FIG. 1 is a block diagram illustrating the sequence of the printing process of a printer. Assume that the printer is equipped with six color inks including cyan C, magenta M, yellow Y, black K, light cyan Lc, and light magenta Lm.

An image signal input unit 101 inputs an image signal from a computer apparatus or the like (not shown). An image signal to be input is, for example, a color image signal which is defined in sRGB as a standard color space or a color space such as AdobeRGB and in which each of R, G, and B is represented by 8-bit data.

A color separation unit 102 uses a color separation table to color-separate (convert) the RGB image signal input from the image signal input unit 101 into an image signal in which each of C, M, Y, K, Lc, and Lm (six channels) corresponding to each ink is represented by 8-bit data.

Figure 2:
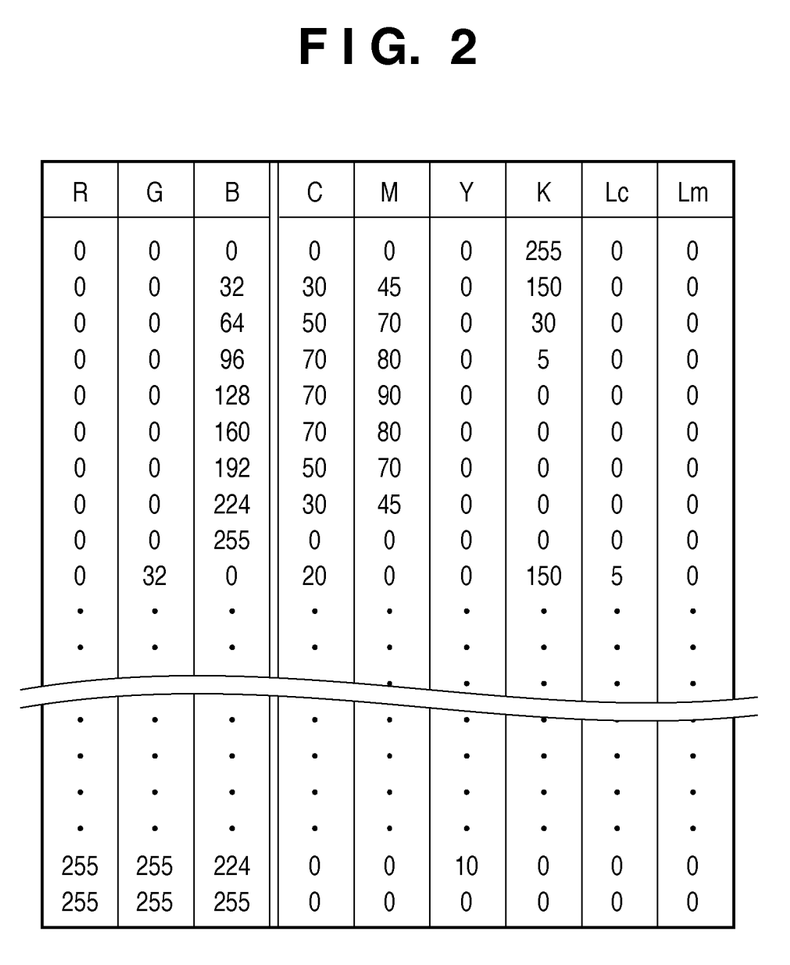
FIG. 2 is illustrates example of a color separation table used by a color separation unit.

FIG. 2 illustrates an example of the color separation table used by the color separation unit 102. This is a lookup table (LUT) that converts an image signal in which each of R, G, and B is represented by 8-bit data into an image signal in which each color corresponding to each of six color inks is represented by 8-bit data.

As shown in FIG. 2, the color separation table stores output values corresponding to $9^3=729$ input values in which the signal value of each of R, G, and B channels is given in nine steps (0, 32, 64, 96, 128, 160, 192, 224, 255). The output value (to be referred to as an ink value hereinafter) is a signal value in which each of C, M, Y, K, Lc, and Lm channels is represented by 8-bit data. The color separation unit 102 looks up this color separation table and uses tetrahedron interpolation, linear interpolation, or the like to convert an input value into an ink value. Note that in an inkjet printer, a printed color produced from a single signal value varies depending on the type of printing paper sheet, printing speed, or the like. For this reason, it is necessary to generate a color separation table for each mode such as the type of printing paper sheet, printing speed, or the like.

A tone correction unit 103 performs a process for decreasing the number of tones of an image signal by converting a CMYKLcLm image signal in which each of six channels is represented by 8-bit data into a printable C'M'Y'K'Lc'Lm' image signal in which each of six channels is represented by 1-bit data. For example, the tone correction unit 103 applies a 16×16 Bayer matrix to an image having color components of six channels. When the pixel value of the color component is larger than the value of the corresponding matrix element, "1" is output. Otherwise, "0" is output. Alternatively, the tone correction unit 103 may use a halftoning method such as error diffusion.

An image output unit 104 is a printer engine that controls discharge of each color ink by an inkjet head in accordance with the value of C'M'Y'K'Lc'Lm' image signal, scans the inkjet head in a main scanning direction, and scans a printing paper sheet in a sub-scanning direction to form an image on the printing paper sheet.

Arrangement of Image Processing Apparatus

Figure 3:
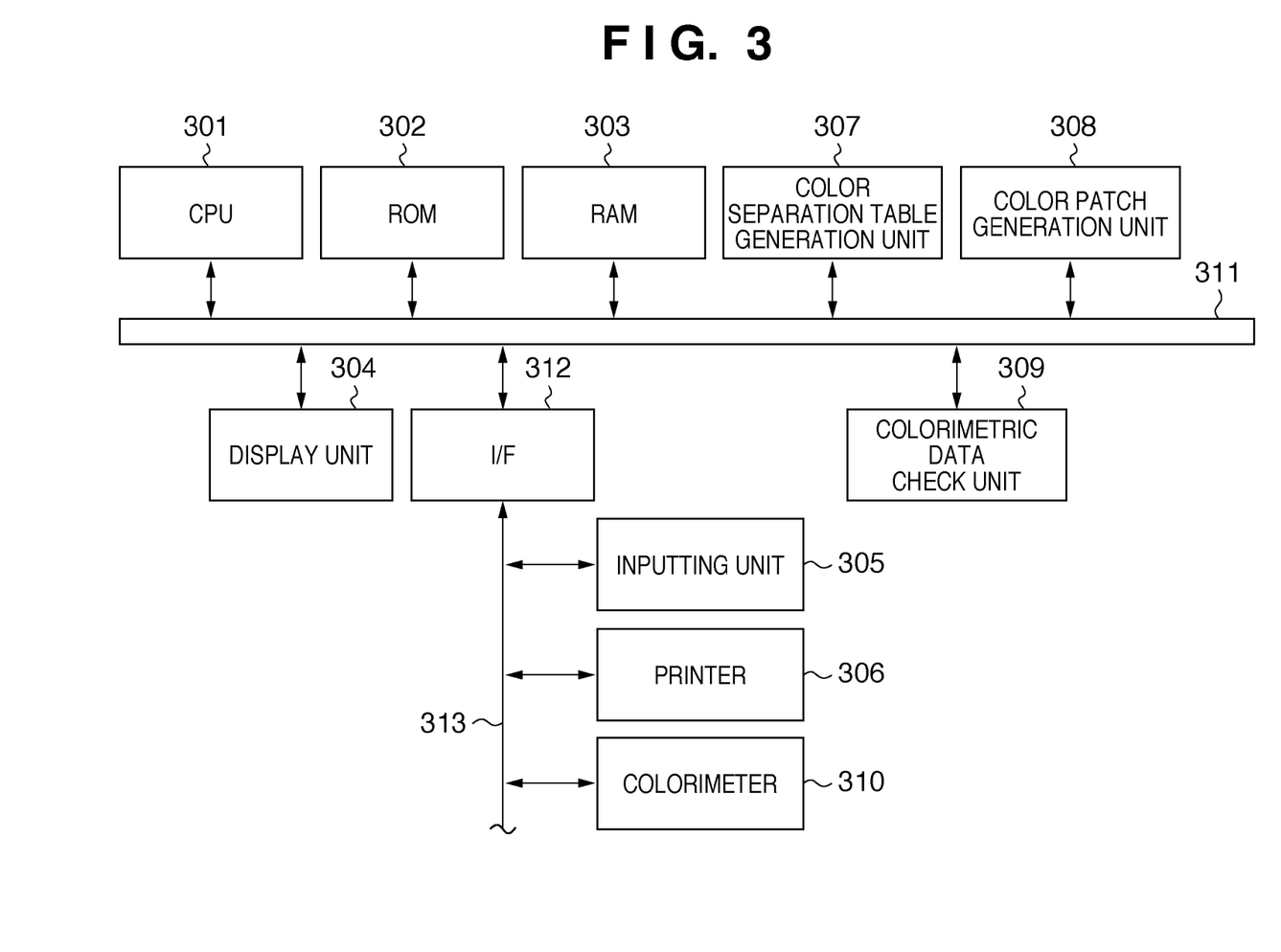
FIG. 3 is a block diagram showing the arrangement of an image processing apparatus that generates the color separation table.

FIG. 3 is a block diagram showing the arrangement of an image processing apparatus that generates the color separation table.

A microprocessor (CPU) 301 uses a random access memory (RAM) 303 as a work memory to perform various programs including programs for processes (described below) stored in a read-only memory (ROM) 302 and controls components (described below) via a system bus 311. In addition to the various programs, the ROM 302 stores various parameters.

The CPU 301 obtains input of a user's operation and instruction from an inputting unit 305 such as a mouse or keyboard via an interface (I/F) 312 for a serial bus 313 such as a USB (Universal Serial Bus). The CPU 301 displays a user interface, a process result, a message including an error message, and the like on a display unit 304 such as a monitor.

A printer 306 and a colorimeter 310 are also connected to the I/F 312. The printer 306 corresponds to the printer shown in FIG. 1, and prints a color chart generated by a color patch generation unit 308. The colorimeter 310 inputs to the image processing apparatus the colorimetric result (colorimetric value) of each color patch of the color chart generated by the color patch generation unit 308 and printed by the printer 306.

A colorimetric data check unit 309 checks whether the colorimetric results of the color chart are correct, and corrects them if necessary. A color separation table generation unit 307 generates a color separation table based on colorimetric data that has undergone check and correction by the colorimetric data check unit 309. The CPU 301 uploads the color separation table generated by the color separation table generation unit 307 to the printer 306. With this arrangement, the color separation unit 102 of the printer 306 can use the color separation table generated by the color separation table generation unit 307.

Generation of Color Separation Table

Figure 4:
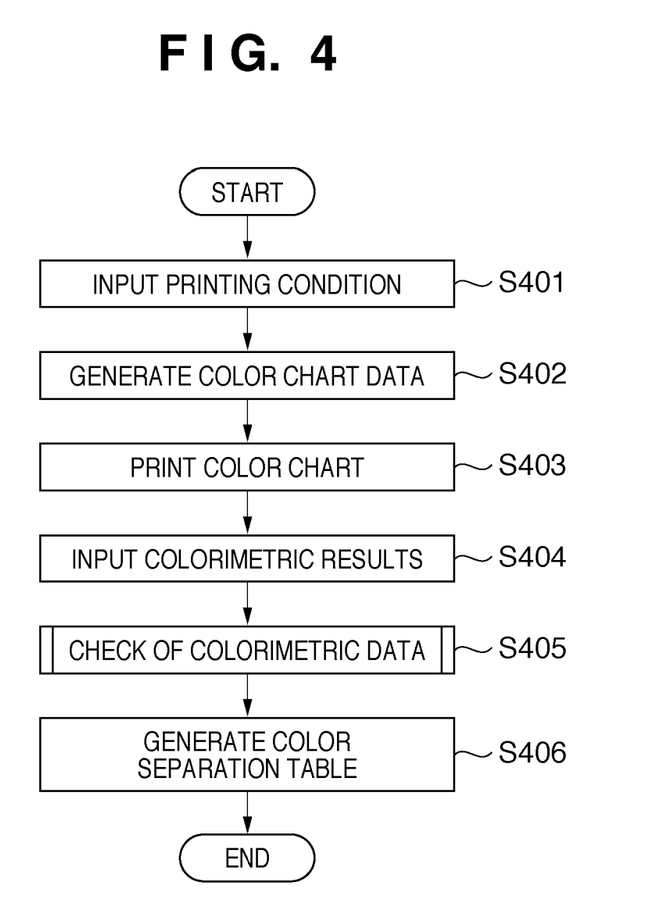
FIG. 4 is a flowchart illustrating an example of a color separation table generation process.

FIG. 4 is a flowchart illustrating an example of a color separation table generation process which the CPU 301 performs by controlling the color separation table generation unit 307, color patch generation unit 308, colorimetric data check unit 309, and the like.

The CPU 301 inputs parameters, such as the type, size, and total amount of applied color materials of a printing paper sheet, which are required to print a color chart using the printer 306 (S401). These parameters may be input from the inputting unit 305 as user's instructions. Also, sets of parameters corresponding to representative printing paper sheets such as a thick glossy paper, glossy paper, and plain paper may be preset, and preset values may be input as parameters by allowing a user to select a printing paper sheet similar to the desired printing paper sheet.

Next, the CPU 301 controls the color patch generation unit 308 to generate color chart data (table) having a patch pattern required to generate the color separation table (S402).

Figure 5:
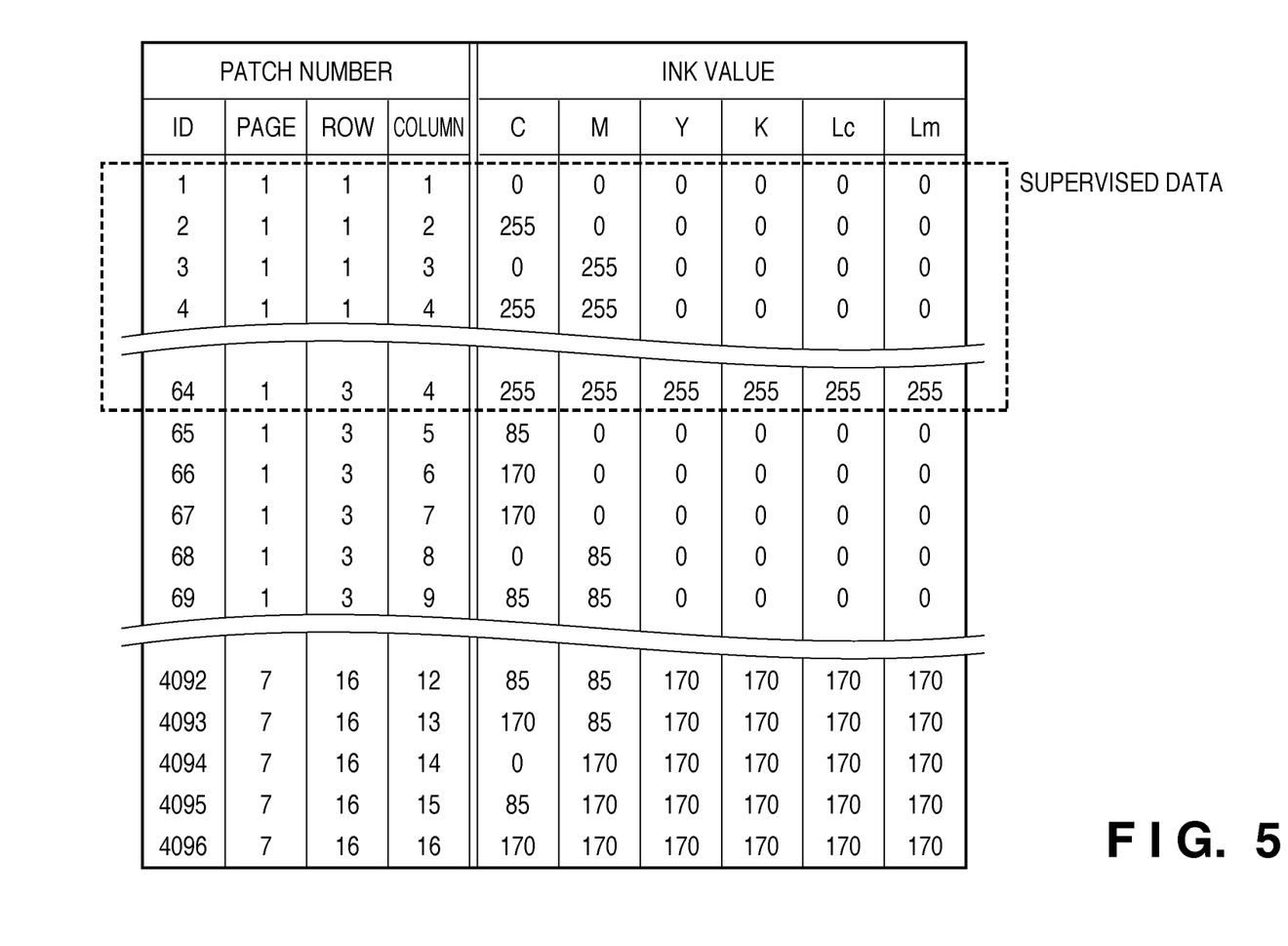
FIG. 5 is a table that shows the print position and ink value of a color patch corresponding to a patch number.

FIG. 5 is a table that shows the print position and ink value of a color patch corresponding to a patch number (ID). For example, the color patch generation unit 308 generates the table shown in FIG. 5, in which the ink value of each color is given in four steps of 0, 85, 170, and 255 and these $4^6=4096$ combinations are stored. Note that the patch pattern of the color chart is not limited to that shown in FIG. 5, and any patch pattern can be used as long as it includes combinations of ink values required for a required color separation process.

Next, the CPU 301 renders a color chart that includes color patches of a predetermined size based on the color chart table generated by the color patch generation unit 308, and outputs rendered CMYKLcLm image signals to the printer 306 (S403). At this time, the CPU 301 controls the printer 306 such that the process of the color separation unit 102 of the printer 306 is passed through. The printer 306 prints the color chart represented by the input CMYKLcLm image signals onto a printing paper sheet supplied by the user.

Figure 6:
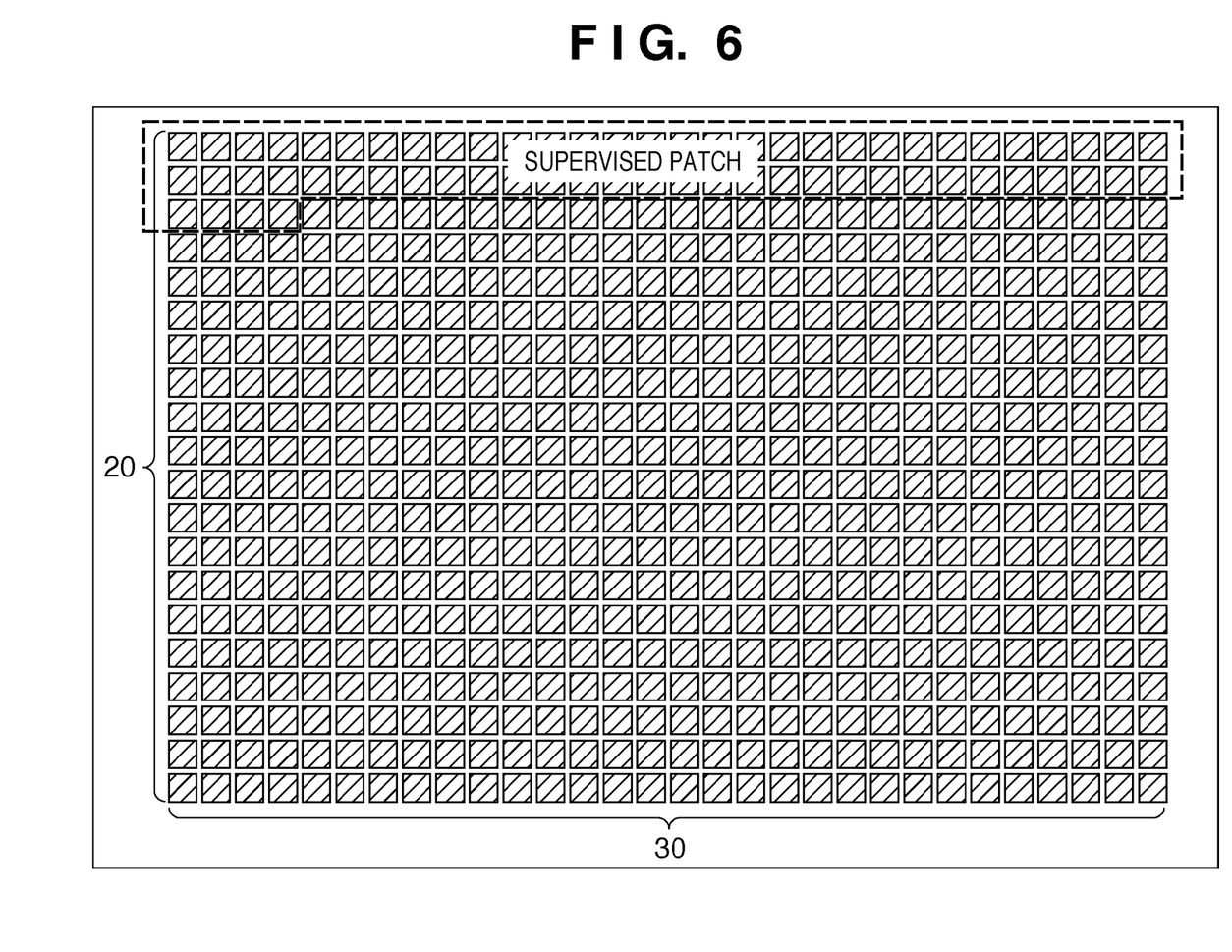
FIG. 6 illustrates a color chart to be printed by a printer.

FIG. 6 illustrates an example of the color chart to be printed by the printer 306. For example, 600, 30×20 patches are printed on one printing paper sheet. For example, since the table shown in FIG. 5 includes 4096 combinations (patch ink values), the color chart shown in FIG. 6 will be printed on seven printing paper sheets.

Figure 7:
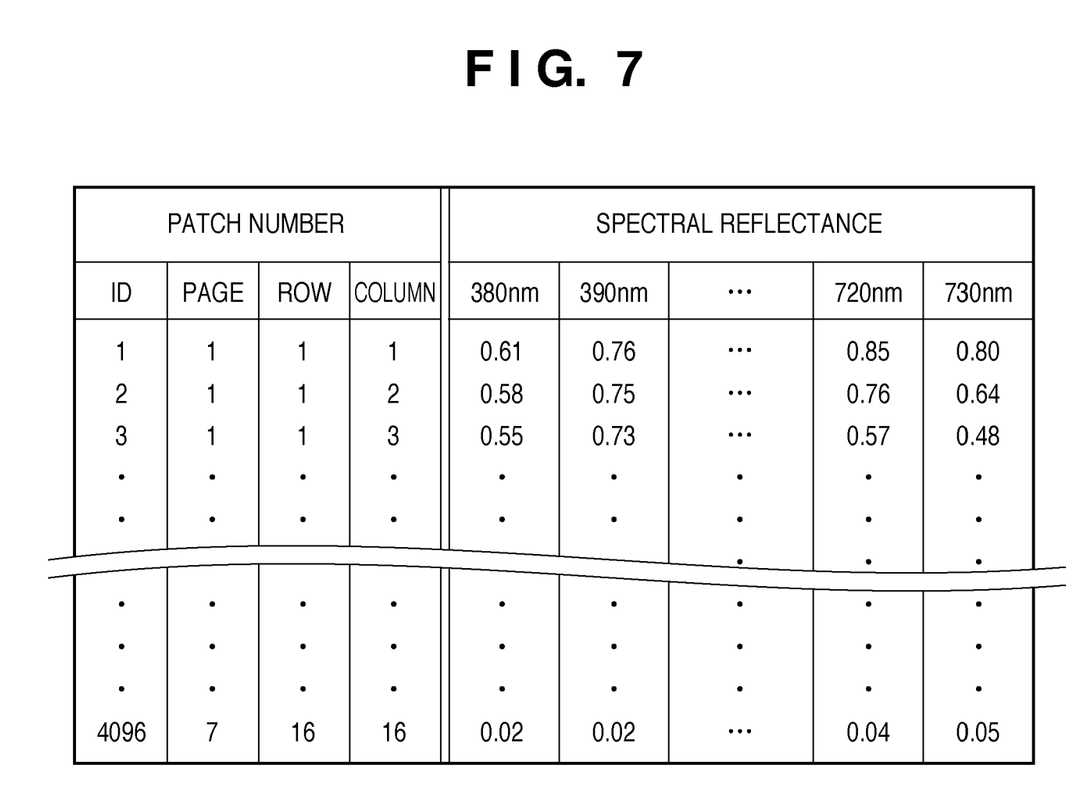
FIG. 7 illustrates an example of colorimetric data that indicates the colorimetric results of a colorimeter.

When printing of the color chart is complete, the user uses the colorimeter 310 to measure the spectral reflectance or color value (e.g., Lab value) of each patch of the color chart in a predetermined order. FIG. 7 illustrates an example of colorimetric data that indicates the colorimetric results of the colorimeter 310. This is a table that shows the correspondence relationship between the patch number (ID) corresponding to the position of a patch and the colorimetric value (spectral reflectance, in this example) as the colorimetric result of that patch. The CPU 301 obtains colorimetric data indicating such correspondence relationships from the colorimeter 310 (S404).

Next, the CPU 301 controls the colorimetric data check unit 309 to check the input colorimetric data (S405). That is, since colorimetric measurement requires a manual operation by a user, an incorrect colorimetric result may be obtained due to, for example, dirt attached onto the color chart or damage to the color chart. In addition, when measuring the colors of a color chart printed on a plurality of (e.g., seven, in this embodiment) sheets, various kinds of errors can easily occur, such as mixing in of a printing paper sheet of a different type, an error in the colorimetric measurement order of the color charts, an error in the orientation of the color chart upon colorimetric measurement, or the like. To solve this problem, whether the input colorimetric data is correct or not is checked. For an error in the colorimetric measurement order, an error in the orientation of the color chart, or the like, the correspondence between the patch number and the colorimetric value is corrected to obtain correct colorimetric data. The details of this process are described below.

Then, the CPU 301 controls the color separation table generation unit 307 to generate a color separation table as shown in FIG. 2 from the colorimetric data (S406). That is, the color separation table generation unit 307 looks up the colorimetric data and determines an ink value with which the color difference between the color of the RGB value defined in the standard color space and the color printed by the printer 306 becomes minimum, thus generating a color separation table.

More specifically, the color separation table generation unit 307 calculates CIE1976 Lab values from the colorimetric data (spectral reflectances). Also, in accordance with the definition in the standard color space, the color separation table generation unit 307 calculates CIE1976 Lab values of the $9^3=729$ input values in which each color of R, G, and B shown in FIG. 2 is given in nine steps (0, 32, 64, 96, 128, 160, 192, 224, and 255). Then, the color separation table generation unit 307 calculates color differences $\Delta E$ between the corresponding Lab values, and selects a patch number which gives a minimum $\Delta E$ as a patch number for the corresponding input value to generate the color separation table. That is, the ink value of the selected patch number is set to the output value for the corresponding input value. At this time, an ink value for an input value may be interpolated by using the ink values of patch numbers in the neighborhood of the patch number that gives a minimum ΔE (strictly speaking, corresponding to grid points surrounding a grid point in the CMYKLcLm color space which corresponds to the patch number that gives the minimum ΔE). Note that a method of generating a color separation table is not limited to that described above and any method of generating a color separation table by looking up the colorimetric data of color patches can be used.

Color Chart

The color chart table illustrated as an example in FIG. 5 is described in more detail below.

As shown in FIG. 5, an ID that is a serial number, a page number upon printing the color chart by dividing it onto a plurality of printing paper sheets, and a row and column that indicate a patch position in each page are stored in the patch number field of the table. In the ink value field, for example, a combination of ink values each of which is given in four steps of 0, 85, 170, and 255 is stored. Note that in this embodiment, a patch pattern is generated such that all combinations of respective inks appear at least once at the top of the table.

In addition, as shown in FIG. 5, the patch pattern is generated such that the combinations of ink values of 0 and 255 ($2^6=64$ combinations) come in the very top portion of the color chart. The colorimetric data check unit 309 uses these 64 combinations of data in the top portion as supervised data for check. In FIG. 6, a portion surrounded by the broken lines indicates color patches (supervised patches) corresponding to supervised data. The colorimetric data check unit 309 estimates the colorimetric values of other color patches from the colorimetric values of the supervised patches to determine whether colorimetric measurement has been performed correctly. The details of this process will be described later.

Note that, for the sake of simplicity, the above description has exemplified a case in which the color patches are printed using the combinations of ink values each of which is given in four steps of 0, 85, 170, and 255, as ink values. However, the amount of color materials that a printing paper sheet can absorb is limited (the total amount of applied color materials). Accordingly, if all the six colors are printed using a maximum ink value of 255, unabsorbed color materials may overflow the area to form a color patch, forming a trailing image of the color patch. Thus, it is desirable to delete a color patch having an ink value larger than the total amount of applied color materials input in step S401 so as not to print it. In addition, in order to print all combinations (all color patches) for the supervised data, when the supervised data has an ink value larger than the total amount of applied color materials, a process for reducing its ink value or the like is performed.

As described above, since the total amount of applied color materials differs in each type of printing paper sheet, the number of color patches or patch pattern to be printed also differs in each type of printing paper sheet. This also makes colorimetric measurement complicated and causes an error in colorimetric measurement.

Check of Colorimetric Data

Figure 8:
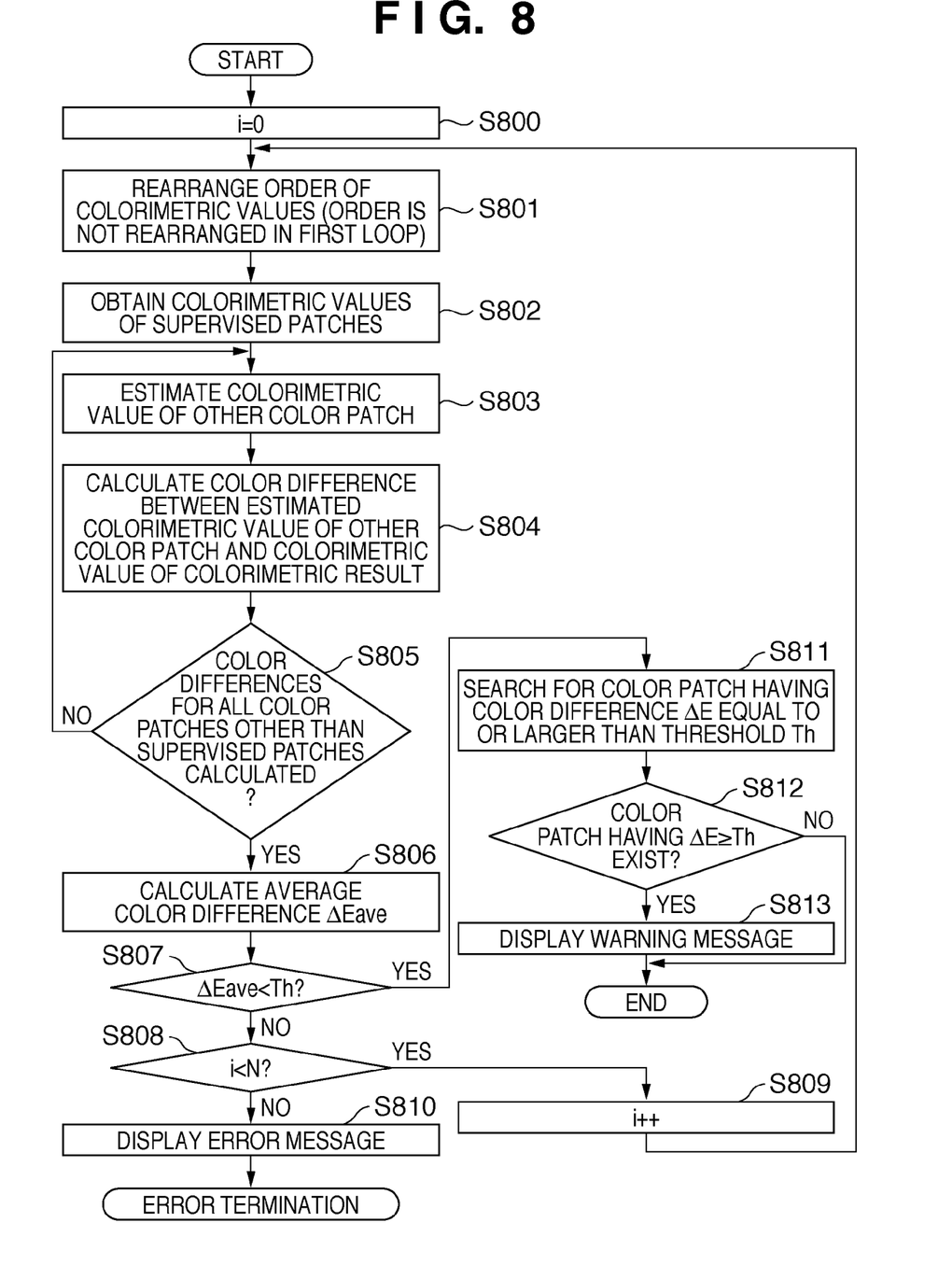
FIG. 8 is a flowchart illustrating checking of colorimetric data by a colorimetric data check unit.

FIG. 8 is a flowchart illustrating check of colorimetric data (S405) by the colorimetric data check unit 309.

The colorimetric data check unit 309 initializes a counter i to 0 (S800), and performs a process (change process) for rearranging the order of the colorimetric values in order to detect the above-described error assumed in advance (S801). For example, assuming a case in which the measurement order of seven color charts is incorrect, the colorimetric data check unit 309 rearranges the page and ID of the colorimetric data shown in FIG. 7. Alternatively, assuming a case in which the orientation of the color chart is incorrect, the colorimetric data check unit 309 rearranges the row, column, and ID of the colorimetric data. Such assumed error types and corresponding actions (rearrangement method) are stored in the ROM 302 in advance. The colorimetric data check unit 309 assumes that the colorimetric data have no error in the first time, and then performs a process (described below) a number of times corresponding to the number N of error types. When the colorimetric data check unit 309 determines that the colorimetric data does not have an error, it immediately terminates the check of the colorimetric data (S405).

Next, the colorimetric data check unit 309 obtains the colorimetric value of the supervised patch from the colorimetric data, obtains the ink value of the supervised data from the patch pattern shown in FIG. 5, and stores their combination (hereinafter, the colorimetric value of the supervised patch) in the RAM 303 (S802). Then, the colorimetric data check unit 309 estimates the colorimetric value of another color patch included in the color chart based on the colorimetric values of the supervised patches by using, for example, Neugebauer equations (S803).

More specifically, the colorimetric data check unit 309 calculates a covering ratio of ink on the printing paper sheet from the ink value of the supervised data, raises the spectral reflectance of the corresponding supervised patch to the power of 1/n, and stores the calculated results in the RAM 303 in correspondence with each other. Note that a function for calculating a covering ratio from an ink value and a constant n (Yule-Neilsen value) depends on the characteristics of the printer 306 and is stored in the ROM 302 in advance. Then, the colorimetric data check unit 309 calculates a covering ratio from the ink value of the other color patch. The colorimetric data check unit 309 calculates the 1/n-th power of the spectral reflectance corresponding to the covering ratio of the other color patch from the correspondence relationships between the covering ratios of the supervised data and the 1/n-th powers of the spectral reflectances of the supervised patches by using liner interpolation to estimate the colorimetric value of the other color patch. The colorimetric value of the other color patch may be estimated from the correspondence relationships between the covering ratios of the supervised data and the 1/n-th powers of the spectral reflectances of the supervised patches by using multiple regression.

Next, the colorimetric data check unit 309 calculates the color difference between the estimated colorimetric value of the other color patch and the colorimetric value indicated by the colorimetric result, and stores it in the RAM 303 (S804). Note that the color difference ΔE can be calculated by calculating the CIE1976 Lab value of the estimated value (spectral reflectance) and that of the spectral reflectance of the colorimetric result. Of course, the RMS value (root mean square error) of the spectral reflectance may be calculated.

Then, the colorimetric data check unit 309 determines whether it has calculated the color differences for all color patches other than the supervised patches (S805). If NO in step S805, the process returns to step S803. For example, when the number of color patches is 4096, the processes in steps S803 and S804 are repeated 4096−64=4032 times.

When it is determined that the color differences have been calculated for all color patches other than the supervised patches (YES in step S805), the colorimetric data check unit 309 calculates the average value of the color differences ΔE (S806). This average value represents an average color difference ΔEave of the other color patches (4032 colors). The colorimetric data check unit 309 determines whether the colorimetric data are correct or not based on the average color difference ΔEave (S807). More specifically, a threshold Th is set in advance, and when the average color difference ΔEave is smaller than the threshold Th, the colorimetric data check unit 309 determines that the order of the colorimetric data is correct. When the average color difference ΔEave is equal to or larger than the threshold Th, the colorimetric data check unit 309 determines that the order of the colorimetric data is incorrect.

When the colorimetric data check unit 309 determines that the order of the colorimetric data is incorrect (NO in step S807), it compares the count value of the counter i and the number N of the error types (S808). If i<N (YES in step S808), the colorimetric data check unit 309 increments the counter (S809) and returns the process to step S801. Therefore, the above-described processes are repeated a number of times corresponding to the number N of error types until the order of the colorimetric data is determined to be correct.

When i=N holds (NO in step S808), it is considered to be necessary to perform printing or colorimetric measurement of the color chart again because there may be an error of the printing paper sheet, difference between the color patch position and colorimetric measurement position, or the like. Accordingly, the colorimetric data check unit 309 displays an error message indicating that printing or colorimetric measurement of the color chart needs to be performed again on the display unit 304 (S810), and terminates the process (error termination). Note that when error termination has occurred, the CPU 301 aborts the color separation table generation process.

When the colorimetric data check unit 309 determines that the order of the colorimetric data is correct (YES in step S807), it examines the color differences ΔE of the other color patches to find a color patch having a color difference ΔE equal to or larger than the threshold Th (or a threshold Th' may be set separately) (S811). When there is not a color patch having ΔE≥Th (NO in step S812), processing terminates normally. When there is a color patch having ΔE≥Th (YES in step S812), the colorimetric data check unit 309 displays on the display unit 304 the patch number specifying that color patch and a warning message indicating that printing or colorimetric measurement of that color patch needs to be performed again (S813), and terminates the process (normal termination). This is an action taken since a color patch having a color difference ΔE equal to or larger than the threshold Th is considered to have an incorrect colorimetric value, for example, due to a smudge or damage. Note that when colorimetric measurement terminates normally, the CPU 301 continues the color separation table generation process. However, the user can interrupt the color separation table generation process in order to perform printing or colorimetric measurement of the color patch again.

As described above, when the colorimetric values of color patches are estimated, it is possible to detect an error in printing or colorimetric measurement and a smudge or damage of the color patch with high precision irrespective of the type of patch pattern.

In addition, since it is not necessary to add a marker image to the color chart, a high-precision colorimeter can be used and no marker analysis is required. Also, since no marker image is printed, the number of color patches printable on one printing paper sheet can be increased. Accordingly, it is possible to decrease the number of color charts to be colorimetrically measured and shorten the time required for colorimetric measurement.

Furthermore, when measuring the colors of a plurality of color charts, it is possible to modify colorimetric data without performing colorimetric measurement again even if there is an error in the colorimetric measurement order of the color charts or an error in the orientation of the color chart. As a result, the number of process steps and cost for colorimetric measurement can be reduced.

The above description has exemplified a case in which predetermined specific patch patterns are arranged in the top portion of the color chart as supervised patches. However, the supervised patch can be any color patch that enables color estimation of other color patches, and its patch pattern or number is not limited. Particularly, when a method such as multiple regression is used for color estimation, not only the combination pattern of ink values of 0 and 255, but also various patch patterns can be used as supervised data.

Also, the above description has exemplified a case in which the spectral reflectance of a color patch is measured. However, an XYZ value or Lab value may be measured. In this case, since three-dimensional colorimetric values are obtained, the operation amount or data amount can of course be reduced compared to a case in which, for example, 36-dimensional spectral reflectance having a step of 10 nm in the range of 380 nm to 730 nm is used. Therefore, it is possible to generate a color separation table at higher speed.

Exemplary Embodiments

The present invention can be applied to a system constituted by a plurality of devices (e.g., host computer, interface, reader, printer) or to an apparatus comprising a single device (e.g., copying machine, facsimile machine).

Further, a storage medium storing program code for performing the above-described processes can be provided to a computer system or apparatus (e.g., a personal computer), reading the program code, by a CPU or MPU of the computer system or apparatus, from the storage medium, then executing the program. In this case, so long as the system or apparatus has the functions of the program, the program may be executed in any form, such as an object code, a program executed by an interpreter, or script data supplied to an operating system.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, an OS (operating system) or the like working on the computer can perform a part or the entire processes in accordance with designations of the program code and realize functions according to the above-described embodiments.

Furthermore, the program code can be read from the storage medium and written in a function expansion card which is inserted into the computer or in a memory provided in a function expansion unit which is connected to the computer, CPU or the like contained in the function expansion card or unit which performs a part or the entire process in accordance with designations of the program code and realizes functions of the above-described embodiments.

In a case where the present invention is applied to the aforementioned storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-081744, filed Mar. 26, 2008, which is hereby incorporated by reference herein in its entirety.

What is claimed is:

1. A color processing apparatus comprising at least a processor and a memory that implement:
an input unit configured to input plural measurement values obtained by measuring a plurality of color patches included in a color chart;
an estimator configured to estimate measurement values of a first number of color patches of the plurality of color patches, which are included in the color chart, other than a second number of color patches of the plurality of color patches, which are disposed at an end of the color chart, using the input measurement values of the second number of color patches, wherein the first number of color patches is greater than the second number of color patches;
a calculator configured to calculate color differences between the estimated measurement values and the input measurement values of the first number of color patches;
a determiner configured to determine whether or not printing of the first number of color patches or measurement of the first number of color patches has been performed correctly, based on the color differences; and
a changing unit configured to change an order of the input plural measurement values in a case where the determiner determines that the measurement has not been performed correctly,
wherein the estimator, the calculator, and the determiner repeat their respective processes using the measurement values whose order has been changed.

2. The color processing apparatus according to claim 1, wherein the color chart is a color chart printed on a printing medium for which a color separation table is not prepared.

3. The color processing apparatus according to claim 1, wherein the at least the processor and the memory further implement a generator configured to generate a color chart that includes the first number of color patches and the second number of color patches.

4. The color processing apparatus according to claim 1, wherein the at least the processor and the memory further implement a warning unit configured to issue a warning using a display unit in a case where the determiner determines that the printing has not been performed correctly, and to issue a warning of a color patch, which is included in the color chart and corresponds to an incorrect input measurement value, based on the color differences in a case where the determiner determines that the printing or the measurement has been performed correctly.

5. The color processing apparatus according to claim 4, wherein the warning unit issues a warning of the color patch corresponding to a measurement value having a color difference equal to or larger than a predetermined value.

6. The color processing apparatus according to claim 1, wherein the at least the processor and the memory further implement a generator configured to generate a color separation table based on the input plural measurement values in a case where the determiner determines that the printing and the measurement have been performed correctly.

7. The color processing apparatus according to claim 1, wherein the second number of color patches are formed using respective maximum amounts of applied color materials of a plurality of color materials used in printing the color chart.

8. The color processing apparatus according to claim 7, wherein a total of the maximum amounts of applied color materials is a predetermined value which differs in each printing medium.

9. A color processing method comprising:
using a processor to perform the steps of:
inputting plural measurement values obtained by measuring a plurality of color patches included in a color chart;
estimating measurement values of a first number of color patches, which are included in the color chart, other than a second number of color patches disposed at an end of the color chart, using the input plural measurement values of the second number of color patches, wherein the first number of color patches is greater than the second number of color patches;
calculating color differences between the estimated measurement values and the input measurement values of the first number of color patches;
determining whether or not printing of the first number of color patches or measurement of the first number of color patches has been performed correctly, based on the color differences; and
changing an order of the input plural measurement values in a case where it is determined that the measurement has not been performed correctly,
wherein the estimating, the calculating, and the determining are repeated using the measurement values whose order has been changed.

10. A non-transitory computer-readable medium storing a computer-executable program for causing a computer to perform a color processing method, the color processing method comprising:
inputting plural measurement values obtained by measuring a plurality of color patches included in a color chart;
estimating measurement values of a first number of color patches, which are included in the color chart, other than a second number of color patches disposed at an end of the color chart, using the input plural measurement values of the second number of color patches, wherein the first number of color patches is greater than the second number of color patches;
calculating color differences between the estimated measurement values and the input measurement values of the first number of color patches;
determining whether or not printing of the first number of color patches or measurement of the first number of color patches has been performed correctly, based on the color differences; and
changing an order of the input plural measurement values in a case where it is determined that the measurement has not been performed correctly,
wherein the estimating, the calculating, and the determining are repeated using the measurement values whose order has been changed.

* * * * *